United States Patent
Somekh et al.

(10) Patent No.: US 8,768,693 B2
(45) Date of Patent: Jul. 1, 2014

(54) AUTOMATIC TAG EXTRACTION FROM AUDIO ANNOTATED PHOTOS

(75) Inventors: Oren Somekh, Bet-Yehoshua (IL); Nadav Golbandi, Karkur (IL); Liran Katzir, Tel Aviv (IL); Ronny Lempel, Zichron Yaakov (IL); Yoelle Maarek, Haifa (IL)

(73) Assignee: Yahoo! Inc., Sunnyvale, CA (US)

( * ) Notice: Subject to any disclaimer, the term of this patent is extended or adjusted under 35 U.S.C. 154(b) by 215 days.

(21) Appl. No.: 13/485,159

(22) Filed: May 31, 2012

(65) Prior Publication Data

US 2013/0325462 A1 Dec. 5, 2013

(51) Int. Cl.
*G10L 19/00* (2013.01)
*H04N 5/76* (2006.01)

(52) U.S. Cl.
USPC ........................................ 704/230; 348/231.4

(58) Field of Classification Search
USPC ..................... 704/231–257; 348/231.1–231.9
See application file for complete search history.

(56) References Cited

U.S. PATENT DOCUMENTS

| | | | |
|---|---|---|---|
| 7,163,151 B2 | 1/2007 | Kiiskinen | |
| 7,324,943 B2 * | 1/2008 | Rigazio et al. | 704/270 |
| 7,574,453 B2 | 8/2009 | Julia et al. | |
| 7,831,598 B2 * | 11/2010 | Ko | 707/736 |
| 8,385,588 B2 * | 2/2013 | Jacoby et al. | 382/100 |
| 2007/0250526 A1 * | 10/2007 | Hanna | 707/102 |
| 2012/0102066 A1 * | 4/2012 | Eronen et al. | 707/769 |
| 2013/0155277 A1 * | 6/2013 | Ezequiel | 348/231.3 |

OTHER PUBLICATIONS

Ahern et al., "ZoneTag: Designing Context-Aware Mobile Media Capture to Increase Participation", In Workshop on Pervasive Image Capture and Sharing (PICS'2006), 2006.
Anguera et al., "Multimodal Photo Annotation and Retrieval on a Mobile Phone", Pro. MIR 2008, pp. 188-194, 2008.
Cherubini et al., "Text versus Speech: A Comparison of Tagging Input Modalities for Camera Phones", MobileHCI'09, Sep. 15-18, 2009, Bonn, Germany.
Sigurbjornsson et al., "Flickr Tag Recommendation based on Collective Knowledge", WWW 2008, Apr. 21-25, 2008, Beijing, China.
Wilhelm et al., "Photo Annotation on a Camera Phone", Extended Abstracts of 2004 Conference on Human Factors in Computing Systems (CHI'2004), pp. 1403-1406, Apr. 24-29, 2004, Vienna, Austria.
Chen et al., "A Method for Photograph Indexing Using Speech Annotation", Proc. PCM'01, pp. 867-872, 2001.
"OAuth", Wikipedia, the free encyclopedia, <<http://en.wikipedia.org/wiki/OAuth>> retrieved Jan. 31, 2012.

(Continued)

*Primary Examiner* — Samuel G Neway
(74) *Attorney, Agent, or Firm* — James J. DeCarlo; Greenberg Traurig, LLP

(57) ABSTRACT

A system and method for assigning one or more tags to an image file. In one aspect, a server computer receives an image file captured by a client device. In one embodiment, the image file includes an audio component embedded therein by the client device, where the audio component was spoken by a user of the client device as a tag of the image file. The server computer determines metadata associated with the image file and identifies a dictionary of potential textual tags from the metadata. The server computer determines a textual tag from the audio component and from the dictionary of potential textual tags. The server computer then associates the textual tag with the image file as additional metadata.

23 Claims, 10 Drawing Sheets

(56) References Cited

OTHER PUBLICATIONS

"comScore, Inc.—Measuring the Digital World", <<http://www.comscore.com/>>, retrieved Jun. 14, 2012.

Datta et al., "Image Retrieval: Ideas, Influences, and Trends of the New Age", ACM Computing Surveys, Vo. 40, No. 2, Article 5, Apr. 2008, pp. 5:1-5:60.

"flickj—Java Interface to flickr API", <<http://flickrj.sourceforge.net/>>, retrieved Jun. 14, 2012.

International Telecommunication Union: ITU-T: Telecommunication Standardization Sector of ITU; T.86 (Jun. 1998); Series T: Terminals for Telematic Services; ITU-T Recommendation T.86 (1998 E).

"Metadata Extraction Tool—Introduction"; <<http://meta-extractor.sourceforge.net/>>; retrieved on Jun. 14, 2012.

"Flickr for mobile"; <<http://mobile.yahoo.com/flickr>>; retrieved Jun. 14, 2012; © 2012 Yahoo!

Horn, "The iPhone is Officially the Most Popular Camera on Flickr", News & Opinion, PCMag, Jun. 22, 2011.

Horn, 43 Percent of People Use Their Cell Phone as Their Primary Camera, Poll Finds, New & Opinion, PC Mag, Jun. 27, 2011.

Sarvas et al., "Metadata Creation System for Mobile Images", MobiSYS'04, Jun. 6-9, 2004, Boston, MA, 2004, pp. 36-48.

"Snapfish Phone Apps", <<http://www.snapfish.com/life/mobile>>, retrieved Jun. 14, 2012.

"Apache Tomcat—Welcome!", <<http://tomcat.apache.org/>>, retrieved Jun. 14, 2012.

Walker et al., "Sphinx-4: A Flexible Open Source Framework for Speech Recognition", Technical Report, Sun Microsystems, Inc., Mountain View, CA, 2004, pp. 1-9.

"Adaptive Multi-Rate audio codec", Wikipedia, the free encyclopedia, <<http://en.wikipedia.org/wiki/Adaptive_Multi-Rate_audio_codec>>, retrieved Jun. 14, 2012.

"WAV", Wikipedia, the free encyclopedia, <<http://en.wikipedia.org/wiki/WAV>>, retrieved Jun. 14, 2012.

* cited by examiner

AUTOMATIC TAG EXTRACTION FROM AUDIO ANNOTATED PHOTOS

FIELD

The present disclosure relates to digital photographs, and more specifically to automatically extracting a tag from an audio annotated photograph.

BACKGROUND

Capturing and uploading photos using mobile devices such as smartphones has become very popular. Whether photos are taken, managed, and/or shared via smartphones or via standalone cameras, obtaining photo metadata or tags from users is often not accomplished. This is often due to the time needed to tag a photo and/or the complexity of tagging a photo (e.g., using a small keyboard).

SUMMARY

Textual tags associated with digital photographs are useful for a variety of reasons, such as for the sharing, management and/or retrieval of photos. This disclosure relates to a system and method for assigning one or more textual tags to an image file from spoken audio associated with the image file. In one aspect, a server computer receives an image file captured by a client device. In one embodiment, the image file includes an audio component embedded therein by the client device, where the audio component was spoken by a user of the client device as an audio tag of the image file. The server computer determines metadata associated with the image file and identifies a dictionary of potential textual tags from the metadata. The server computer determines a textual tag from the audio component and from the dictionary of potential textual tags (e.g., by speech recognition technologies). The server computer then associates the textual tag with the image file as additional metadata.

The server computer can communicate the textual tag with the image file to a content server and/or to the client device for display. The server computer can store the image file and the textual tag and/or can enable the user to perform operations related to the image file using the textual tag. In one embodiment, the enabling of the user to perform operations related to the image file includes enabling sharing of the image file with other users and/or receiving a search term from the client device, searching the textual tags for the search term, and communicating the image file associated with the textual tag to the client device. In one embodiment, the user can play the audio component of the image (e.g., while viewing the image).

In one embodiment, the identifying of the dictionary of potential textual tags includes receiving, from a content server, a plurality of previously stored tags and/or determining the dictionary from the metadata and from the plurality of previously stored tagged images. In one embodiment, the server uses geo information to collect tags from nearby taken photos.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
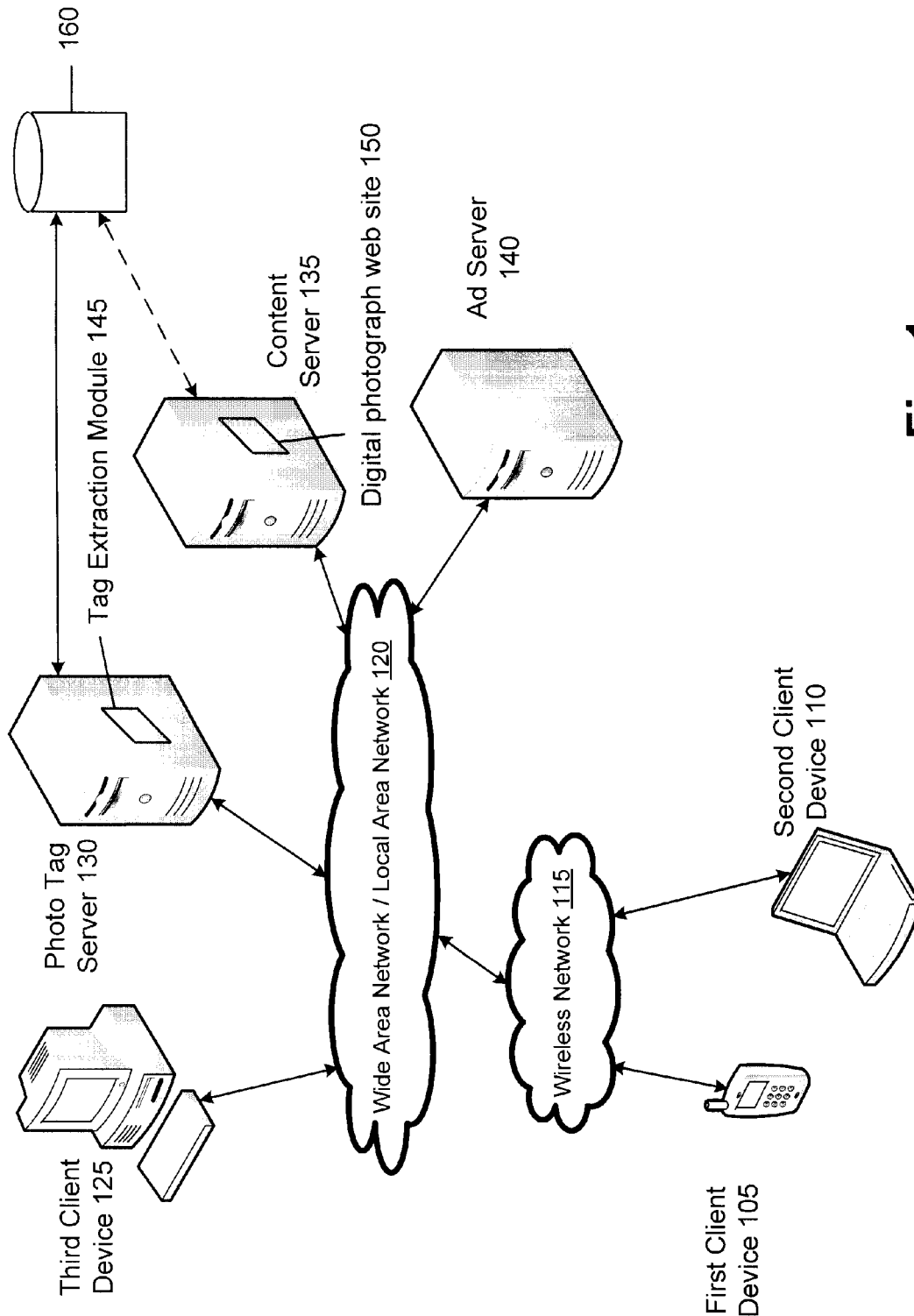
FIG. 1 is a block diagram of client devices communicating over a network with server computers in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1 is a schematic diagram illustrating an example embodiment of a network and devices implementing embodiments of the present disclosure. Other embodiments that may vary, for example, in terms of arrangement or in terms of type of components, are also intended to be included within claimed subject matter. FIG. 1 includes, for example, a first client device 105 and a second client device 110 in communication over a wireless network 115. The wireless network 115 is connected to a local area network (LAN)/wide area network (WAN) 120, such as the Internet, so that the first client device 105 and the second client device 110 can communicate with a third client device 125, a photo tag server 130, a content server 135, and/or an ad server 140. Although shown as a wireless network 115 and WAN/LAN 120, the first client device 105 and/or the second client device 110 can communicate with each other, the third client device 125 and/or servers 130, 135, 140 via any type of network. Client device 105 as used herein is a general term for a client device and can include one or more of the first client device 105, the second client device 110, and/or the third client device 125. Further, although shown as a separate component, the photo tag server 130 may be part of any of the other shown components, such as the content server 135.

In one embodiment, the client device 105 is a mobile device such as a smartphone (e.g., iPhone® or Android Phone®) or mobile phone with a built-in camera that can be used to take digital photographs. In one embodiment, the client device 105 is a camera that can communicate with one or more of the other client devices and/or servers 130, 135, 140 (e.g., via wifi).

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content server 135 may include a device that includes a configuration to provide content via a network to another device. A content server 135 may, for example, host a site, such as a social networking site, examples of which may include, without limitation, Flickr®, Twitter®, Facebook®, LinkedIn®, or a personal user site (such as a blog, vlog, online dating site, etc.). A content server 135 may also host a variety of other sites, including, but not limited to business sites, educational sites, dictionary sites, encyclopedia sites, wikis, financial sites, government sites, etc.

Content server 135 may further provide a variety of services that include, but are not limited to, web services, third-party services, audio services, video services, email services, instant messaging (IM) services, SMS services, MMS services, FTP services, voice over IP (VoIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

From many perspectives, a good time to tag an image file (e.g., digital photograph) is while or shortly after the image file (e.g., photo) is taken. At this time, the user is aware of the reasons that made her take the photo. She knows the time, place, and/or the subject or event that the photo captures. While it is easy to upload photos to a digital photograph web site (e.g., Flickr®) from a client device 105, users of the client device 105 typically find it inconvenient to enter textual tags while taking photos.

In one embodiment, the photo tag server 130 provides the client device 105 with the capability of specifying a tag via audio. For example, the photo tag server 130 may provide a web site or mobile application (e.g., via an "app store") to enable this or may install a plug-in module onto the client device 105 to enable this functionality. In another embodiment, the client device 105 already has this functionality. The user can take a photo using the client device 105 and, shortly after taking the photo, speak into the client device 105 to tag the photo with the spoken words. In one embodiment, the client device 105 also assigns metadata to the photo that can be generated or determined at the client device without specific user input, such as the location (e.g., obtained via GPS coordinates or cellular triangulation), time that the photo was taken, type of client device 105, time of day, direction of camera, user of the client device 105 (e.g., obtained via login information, obtained via face recognition), etc.

Figure 2:
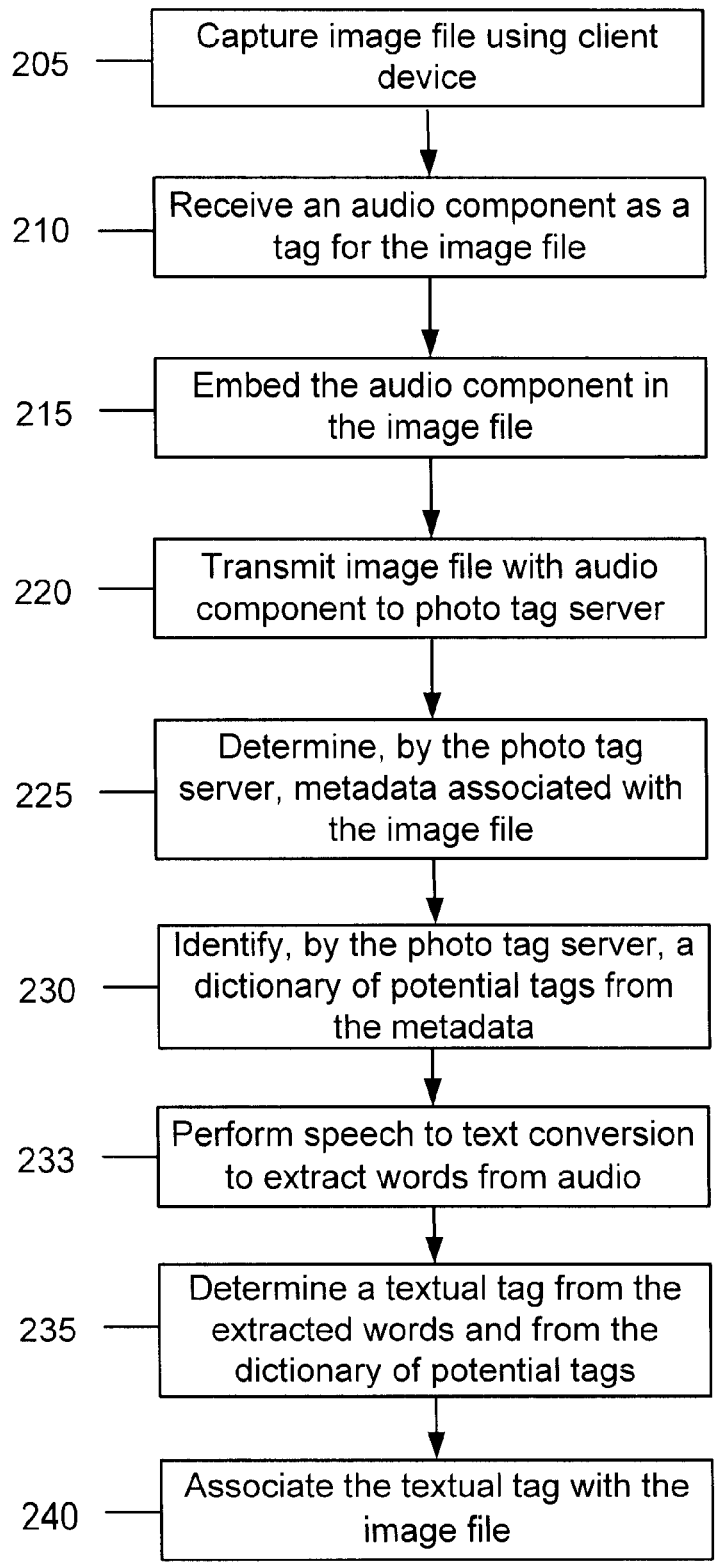
FIG. 2 is a flowchart illustrating steps performed by a client device and a server computer in accordance with an embodiment of the present disclosure.

Also referring to FIG. 2, in one embodiment, a user of the client device 105 captures an image file (e.g., takes a digital photograph) using the client device 105 (step 205). The user of the client device 105 then speaks an audio component, such as one or more numbers, letters, and/or words, to be used as a tag for the image file. The client device 105 receives or records this audio component (step 210). In one embodiment, the client device 105 embeds the audio component in or otherwise associates it with the captured image file (step 215). In one embodiment, the user transmits the image file and the audio component to the photo tag server 130 and the server 130 receives the image file and the embedded audio component (step 220).

In one embodiment, the photo tag server 130 determines the metadata associated with the image file (step 225) and identifies a dictionary of potential textual tags from the metadata (step 230). The dictionary of potential textual tags may be stored on the photo tag server 130 or may be retrieved from the content server 135. In one embodiment, the photo tag server 130 searches a database 160 for words to include in the dictionary of potential textual tags. This database may be part of or in communication with the photo tag server 130 and/or the content server 135.

In one embodiment, the photo tag server 130 creates the dictionary of potential textual tags via "wisdom of the crowd"—e.g., by utilizing popular tags often used by many users. In one embodiment, the database 160 may include tags typically used by the user of the client device 105, tags associated with the location that the image file was captured by the client device 105, tag recommendation technologies, popular tags entered by users (e.g., the top fifty popular tags), information obtained from the user's social network, names of real world entities such as restaurants, events, venues near the user's location, or any other word or phrase.

The database 160 may also include photographs (and, for example, associated tags) that were uploaded to the digital photograph web site 150 by users. In one embodiment, the photo tag server 130 creates the dictionary based on the above tags or information. In one embodiment, the selection of tags stored in the database 160 for the dictionary of potential textual tags is determined by selections made by the user (e.g., as part of the user creating an account with the photo tag server 130 and/or content server 135 and/or digital photograph web site 150). For example, the user may specify that the dictionary of potential textual tags should include only tags previously used by the user.

In one embodiment, the photo tag server 130 generates the dictionary of potential textual tags by searching through tags and/or photographs stored in the database 160 using a specific search criteria. For example, the photo tag server 130 may analyze the metadata assigned to a photo to facilitate the searching of the database 160 and the determination of the suggested tags in the dictionary. For instance, if the metadata states that a photo was taken at the Eiffel Tower, Paris, France, the photo tag server 130 may only search for photos in the database 160 that have a location in France. The photo tag server 130 may then select the tags associated with the photo for the dictionary of potential textual tags. In another embodiment, the photo tag server 130 may use the metadata to determine tags stored in the database 160 that are associated with France or Paris or the Eiffel Tower. In one embodiment, after determining tags associated with France or Paris or the Eiffel Tower, the photo tag server 130 may use the other tags associated with a photograph having a tag associated with France or Paris or the Eiffel Tower in the dictionary of potential textual tags.

The dictionary of potential textual tags can include tags typically used by the user of the client device 105, tags associated with the location that the image file was captured by the client device 105, popular tags entered by users, etc. For example and as stated above, the photo tag server 130 may determine a location that the image file was taken by the client device 105 via the metadata and determine potential textual tags to include in the dictionary of potential textual tags from this location. For example, the photo tag server 130 includes tags that are within a vicinity of the location (e.g., 1 mile away from location), associated with points of interest at or near the location, etc.

In one embodiment, the photo tag server 130 includes a tag extraction module 145. The tag extraction module 145 may be a speech to text engine, such as SPHINX, a speech recognition engine developed in Carnegie Mellon University. SPHINX, which is described in more detail below, is a continuous-speech, speaker-independent recognition system that makes use of hidden Markov acoustic models (HMMs) and an n-gram statistical language model. SPHINX is typically implemented in JAVA. Although shown as part of the photo tag server 130, the tag extraction module 145 may in another embodiment be independent from and in communication with the photo tag server 130.

In one embodiment, the photo tag server 130 transmits the image file, the audio component and the dictionary of potential textual tags to the tag extraction module 145. The tag extraction module 145 utilizes the dictionary of potential textual tags to aid in its speech to text conversion. The tag extraction module 145 performs a speech to text conversion to extract words from the audio component (Step 235). The tag extraction module 145 isolates words from the audio component. In one embodiment, the tag extraction module 145 uses the dictionary of potential textual tags during the speech to text conversion to narrow the choices of words that can be extracted from the speech to text conversion of the audio component. This narrowing increases the precision performance of the speech recognition engine. Thus, the precision of the selected tags increases.

In one embodiment, the tag extraction module 145 attempts to match the words in the dictionary of potential textual tags with the isolated words from the audio component (the results of the speech to text conversion process). In one embodiment, if an exact match does not exist, the "best" match is selected (e.g., word in dictionary of potential textual tags is part of the isolated word from the speech to text conversion process). The tag extraction module 145 determines a textual tag for the image file from its speech to text conversion of the audio component and from the dictionary of potential textual tags (step 235). Thus, by utilizing a dictionary of potential textual tags and selecting one or more textual tags from a match of the dictionary of potential textual tags and the isolated words (from the speech to text conversion process), in one embodiment the accuracy of the selected textual tag increases because the dictionary of potential textual tags is smaller than (and therefore narrower than) a larger vocabulary, such as the entire English language.

In one embodiment, the photo tag server 130 (or the tag extraction module 145) associates the textual tag with the image file as additional metadata (step 240). Although shown as a separate component, photo tag server 130 (and/or tag extraction module 145) may, in another embodiment, be part of the content server 135 and/or the client device 105.

In one embodiment, the photo tag server 130 transmits the image file with the textual tag (and/or the audio component) to the content server 135 for display on or indexing by a digital photograph web site 150, such as for example Flickr®.

In one embodiment, the audio component of the image can be played at the first client device 105 and/or the digital photograph web site 150 (e.g., regardless of the tag extraction process). In this manner, the user experience is likely enhanced by the sounds and speech recorded while (or near) the time the image was taken. In one embodiment, the tag recognition is performed on the client device 105 and the dictionary of potential textual tags is received from the digital photograph web site 150.

In one embodiment, ad server 140 (or any of the servers shown in FIG. 1) communicates one or more advertisements to the client device 105, such as advertisements based on the textual tag or advertisements based on the dictionary of potential textual tags, by using the tag or tags as keywords, for example, which may in turn be provided to ad servers 140 or ad exchanges (not shown) to obtain advertisements relevant to or related directly or contextually with the tag or tags.

A process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers.

For web portals like Yahoo!, advertisements may be displayed on web pages resulting from a user-defined search based at least in part upon one or more search terms. Advertising may be beneficial to users, advertisers or web portals if displayed advertisements are relevant to interests of one or more users. Thus, the present tag extraction system can be used to infer user interest, user intent or to subsequently target relevant advertising to users.

Ad server 140 comprises a server that stores online advertisements for presentation to users. "Ad serving" refers to methods used to place online advertisements on websites, in applications, or other places where users are more likely to see them, such as during an online session or during computing platform use, for example.

During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Figure 3:
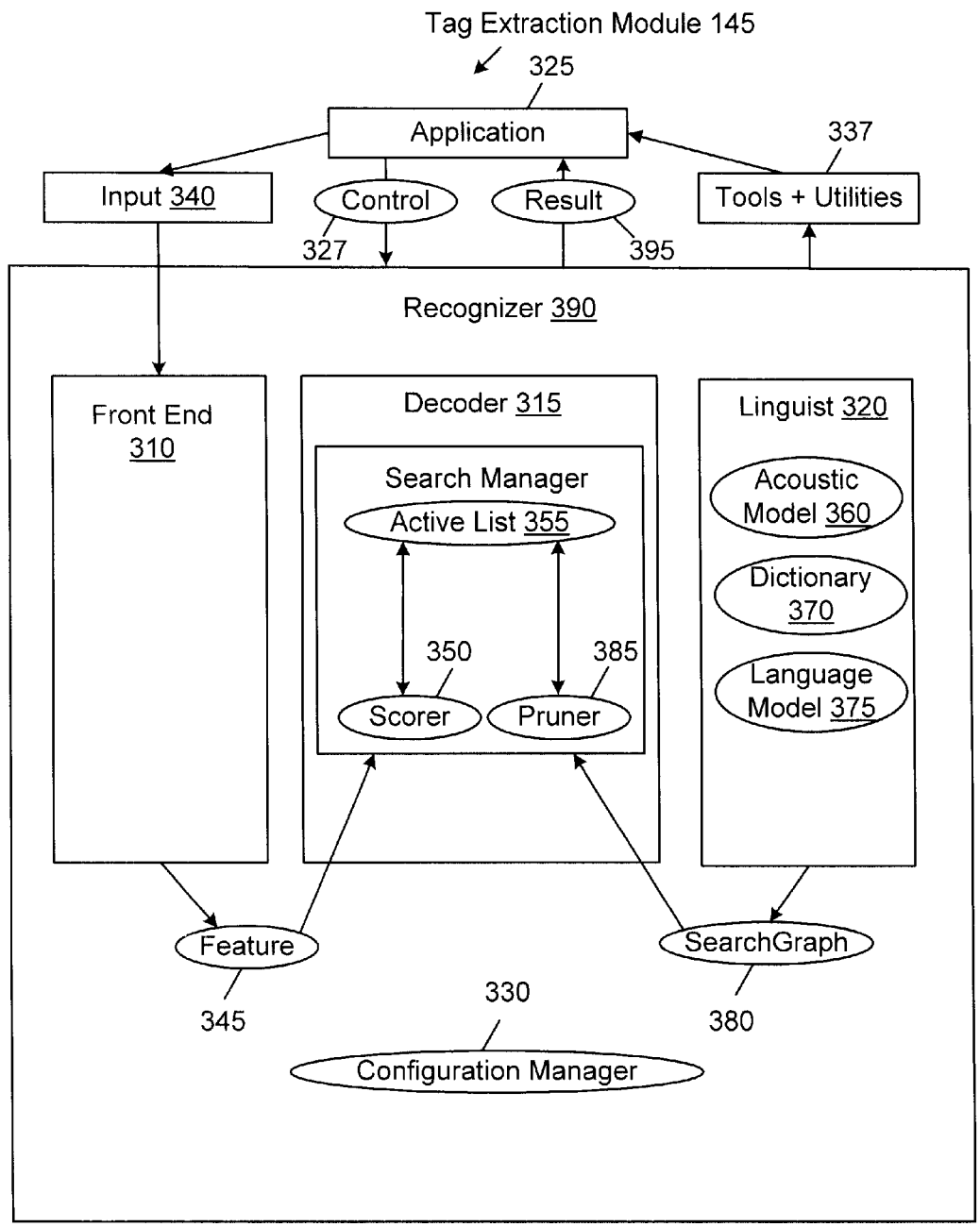
FIG. 3 shows an example of an internal architecture of a tag extraction module in accordance with an embodiment of the present disclosure.

As described above, SPHINX is a speech to text converter that makes use of hidden Markov acoustic models (HMMs) and an n-gram statistical language model. FIG. 3 shows an embodiment of the internal architecture of the tag extraction module 145. In one embodiment, the tag extraction module 145 includes three primary modules—the front end 310, the decoder 315, and the linguist 320. In one embodiment, an application 325 can configure or plug in its own logic to each of the modules via control 327, thereby becoming a partner in the recognition process. The tag extraction module 145, through configuration manager 330, has many configurable parameters for tuning system performance. In one embodiment, the linguist 320 communicates tools and utilities 337 to the application 325. The application 325 provides input 340 to the front end 310. The front end 310 performs digital signal processing (DSP) on the input 340. The front end 310 converts this input 340 into a feature 345 which is used for decoding in the rest of the system. The front end 310 submits this feature 345 to a scorer 350 of decoder 315. In one embodiment, the scorer 350 assigns a score to each received feature 345 and communicates scores with an active list 355.

The linguist 320 embodies the linguistic knowledge of the system and includes an acoustic model 360 to recognize speech. The acoustic model is a model created by taking audio recordings of speech, and their text transcriptions, and using software to create statistical representations of the sounds that make up each word. The linguist 320 also includes a dictionary 370 and a language model 375 to facilitate the recognition of words. Since tags do not possess the structure of a language, in one embodiment the language model 375 defines a grammar based on a list of words or expressions used to support trivial connected word recognition that is the equivalent of a unigram grammar with equal probabilities. The linguist 320 generates a search graph 380 to facilitate the searching of words. The graph structure is produced by the linguist according to certain criteria (e.g., the grammar) using knowledge from the dictionary 370, the acoustic model 360, and the language model 375. This search graph 380 is then transmitted to pruner 385. The pruner 385 prunes the active list 355 according to certain strategies. Recognizer 390 determines which word was spoken to be the tag of the image and submits the textual tag as result 395. As mentioned above, this tag can be used as an ad keyword that can be provided to advertisers to bid on for ad placement purposes.

In one embodiment, the audio portion of the image can be played at the mobile device and sharing site, regardless of the tag extraction process. This way, the user experience is enhanced by the sounds and speech recorded while (or near) the time the image was taken.

Figure 4:
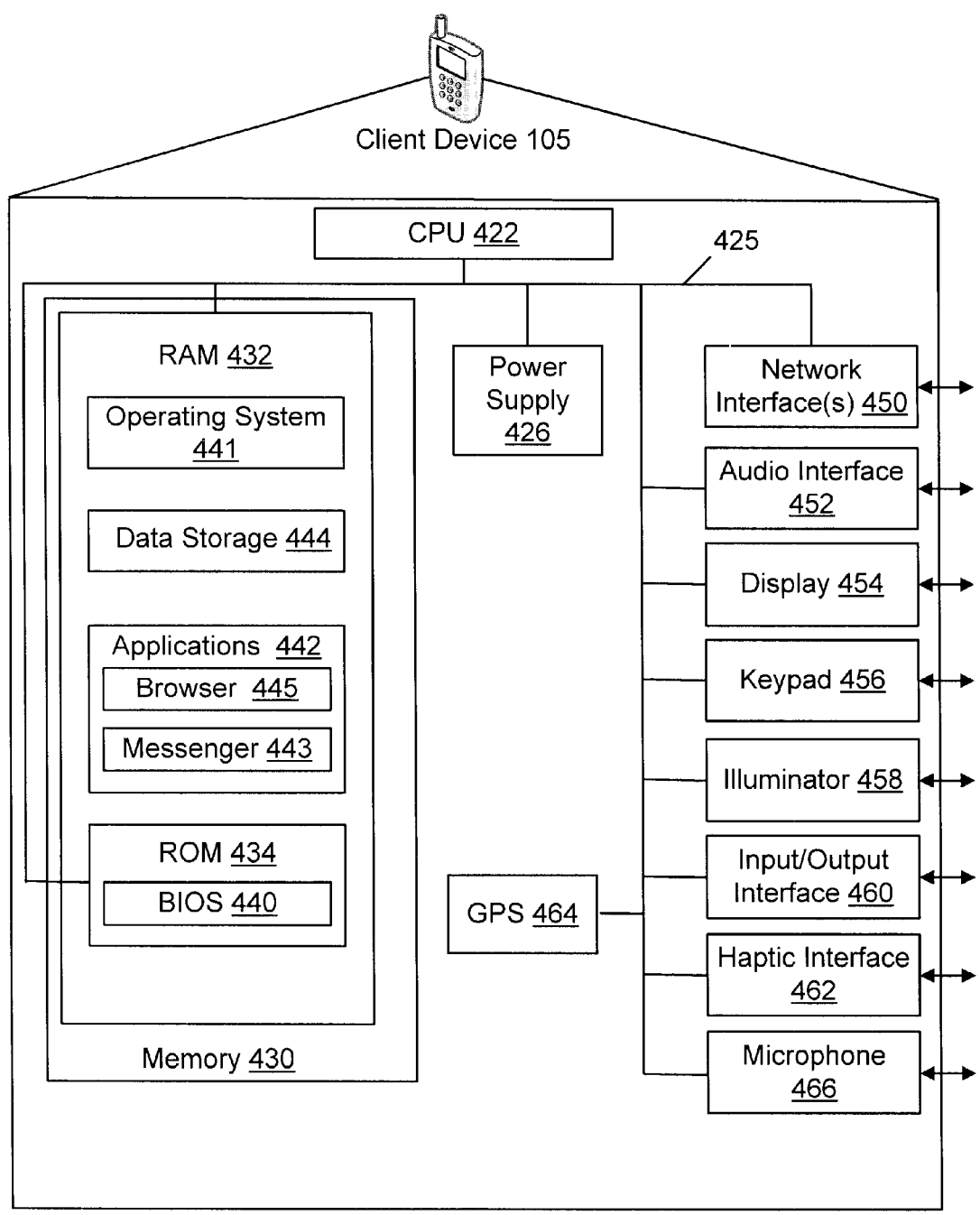
FIG. 4 is a block diagram of components of a client device in accordance with an embodiment of the present disclosure.

FIG. 4 shows one example of a schematic diagram illustrating a client device 105. Client device 105 may include a computing device capable of sending or receiving signals, such as via a wired or wireless network. A client device 105 may, for example, include a desktop computer or a portable device, such as a cellular telephone, a smartphone, a display pager, a radio frequency (RF) device, an infrared (IR) device, a Personal Digital Assistant (PDA), a handheld computer, a tablet computer, a laptop computer, a digital camera, a set top box, a wearable computer, an integrated device combining various features, such as features of the foregoing devices, or the like.

The client device 105 may vary in terms of capabilities or features. Claimed subject matter is intended to cover a wide range of potential variations. For example, a cell phone may include a numeric keypad or a display of limited functionality, such as a monochrome liquid crystal display (LCD) for displaying text, pictures, etc. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device 105 may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn°, Twitter®, Flickr®, or Google+®, to provide only a few possible examples. A client device may also include or execute an application to communicate content, such as, for example, textual content, multi-media content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

As shown in the example of FIG. 4, client device 105 may include one or more processing units (also referred to herein as CPUs) 422, which interface with at least one computer bus 425. A memory 430 can be persistent storage and interfaces with the computer bus 425. The memory 430 includes RAM 432 and ROM 434. ROM 434 includes a BIOS 440. Memory 430 interfaces with computer bus 425 so as to provide information stored in memory 430 to CPU 422 during execution of software programs such as an operating system 441, application programs 442, device drivers, and software modules 443, 445 that comprise program code, and/or computer-executable process steps, incorporating functionality described herein, e.g., one or more of process flows described herein. CPU 422 first loads computer-executable process steps from storage, e.g., memory 432, data storage medium/media 444, removable media drive, and/or other storage device. CPU 422 can then execute the stored process steps in order to execute the loaded computer-executable process steps. Stored data, e.g., data stored by a storage device, can be accessed by CPU 422 during the execution of computer-executable process steps.

Client device 105 can also include one or more of a power supply 426, network interface 450, audio interface 452, a display 454 (e.g., a monitor or screen), keypad 456, illuminator 458, I/O interface 460, a haptic interface 462, a GPS 464, and/or a microphone 466.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Thus, although described as a smartphone, the client device 105 can be any mobile device with a GPS, camera, and audio recording circuit(s), such as a smartphone, tablet, digital camera, etc. In another embodiment, the audio tags can be added at a later point in time, after the image has been uploaded to the sharing site. If the image has geo location, the same procedure can be conducted in a later time and over a different device (e.g., a PC used to browse the images of the sharing site).

Figure 5:
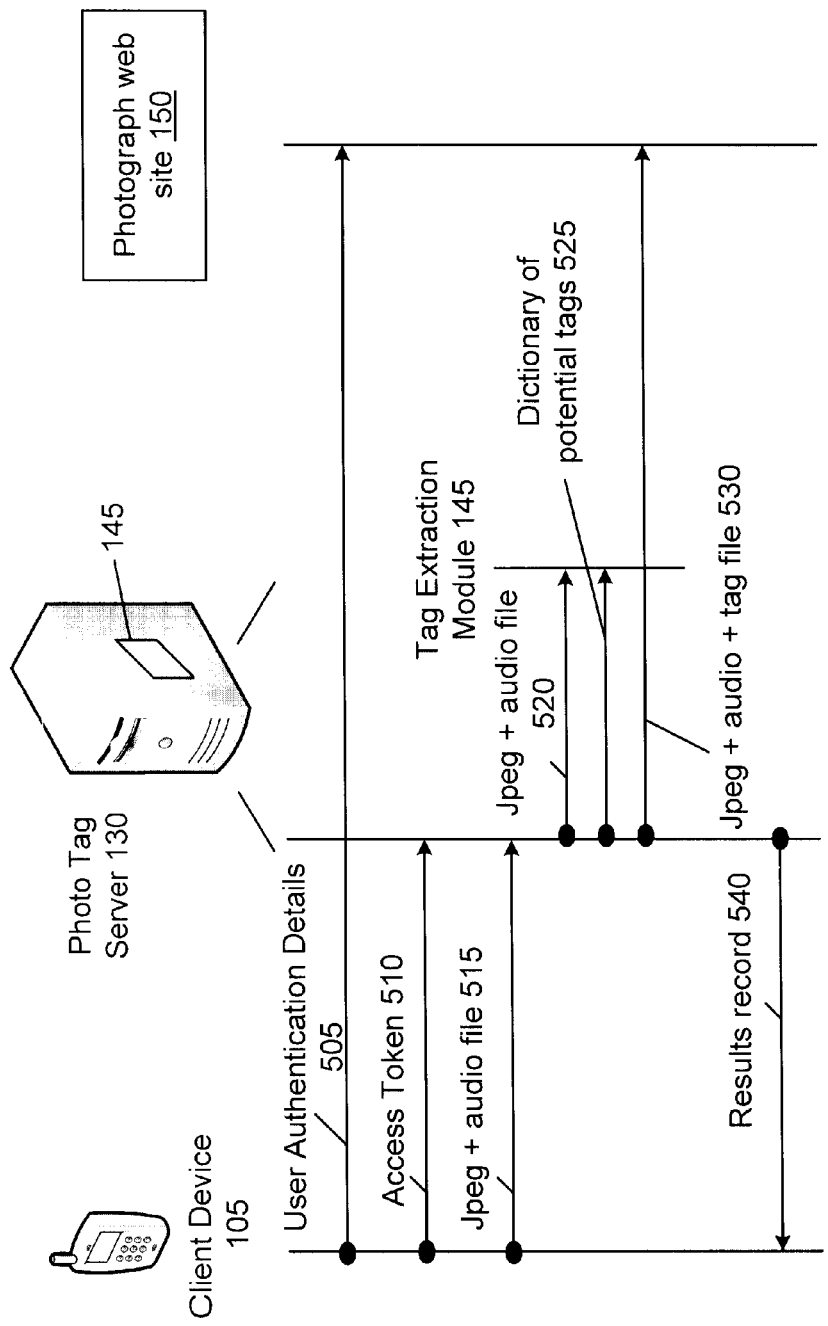
FIG. 5 is a sequence diagram illustrating the steps performed to obtain a textual tag for a digital photograph in accordance with an embodiment of the present disclosure.

FIG. 5 is an embodiment of a sequence diagram illustrating steps performed to obtain a textual tag for a digital photograph. In one embodiment, the client device 105 transmits user authentication details 505 to the content server 135 (e.g., to the digital photograph web site 150). In one embodiment, the user authentication details 505 are the user's login information (e.g., username and password). In another embodiment, the client device 105 uses an authentication token that is provided at the beginning of a session according to an open authorization protocol (e.g., the OAuth protocol). In one embodiment, the client device 105 transmits an access token 510 to the photo tag server 130. This access token 510 enables the client device 105 to access the photo tag server 130.

The user then uses the client device 105 to capture an image file and to add an audio component to the file. In one embodiment, the image file is a JPEG file and the audio component is an audio file. In one embodiment, the audio component is inserted into the image file in a way that preserves the JPEG file format. In one embodiment, the audio component is converted into WAV format, encapsulated by a header and embedded in JPEG's application specific blocks (e.g., blocks 3-13). The header can include various meta information, such as vocoder parameters, number of audio channels, recording time and date, and audio data length. In one embodiment, a 16 bit 16 kHz linear PCM encoding is used, which facilitates up to 20 seconds of audio annotation. In one embodiment, the client device 105 includes voice encoders such as a NB- and WB Adaptive-Multi-Rate-audio codec to reduce the photo file inflation due to the additional audio component. In another embodiment, a pointer is inserted into the image file that points to the audio component which is stored at another location.

The image file and audio file 515 are transmitted from the client device 105 to the photo tag server 130. The photo tag server 130 communicates the image file and audio file 515 to the tag extraction module 145 (shown with arrow 520). In one embodiment, the photo tag server 130 also communicates all or part of the dictionary of potential textual tags 525 to the tag extraction module 145. In one embodiment, the dictionary of potential textual tags can include tags typically used by the user of the client device 105, tags associated with the location that the image file was captured by the client device 105, popular tags entered by users (e.g., the top five popular tags), information obtained from the user's social network, names of real world entities such as restaurants, events, and venues near the user's location, etc. The photo tag server 130 can determine the dictionary of potential textual tags from tags stored in its memory, from an external memory, from the content server 135, or any other storage or location.

In one embodiment, the dictionary of potential textual tags 525 reduces the vocabulary used by the tag extraction module 145 to increase the precision while maintaining a reasonable recall level. In one embodiment, tag recommendation technology is used to generate the dictionary. In one embodiment, ZoneTag® (developed by Yahoo!) provides context-based tag suggestions.

In one embodiment, the tag extraction module 145 extracts a tag from the audio component. In one embodiment, the tag extraction module 145 uses the dictionary of potential textual tags to determine the textual tags from the extracted tags from the speech recognition engine. Thus, the dictionary of potential textual tags narrows the number of choices of a tag available for a particular audio component (and therefore increases the precision of the selected tags). In one embodiment, the tag extraction module 145 determines a tag and associates the tag with the JPEG file and audio component as additional metadata for the image file. The photo tag server 130 transmits the JPEG file, audio component, and tag file 530 to the photograph web site 150 to enable the user to perform one or more operations related to the image file, such as searching for the image file (e.g., by textual tag or textual tags, by metadata, etc.), searching for the textual tag(s), sharing the image file with one or more other users (e.g., via a social networking site, via email, etc.), etc. In one embodiment, the photo tag server 130 transmits a results record 540 back to the client device 105. The results record 540 can include the image file, audio component, and/or textual tag associated with the image file. In one embodiment, the results record 540 also includes the dictionary of potential textual tags 525.

In one embodiment, the tag extraction module 145 (and/or client device 105) requires the user to take part in a training phase. In one embodiment of the training phase, the user is asked to repeat and record a few words. After the words are recorded, in one embodiment the tag extraction module 145 generates a new device dependent acoustic model to enhance the tag extraction module's accuracy. In one embodiment, a MetaData Extract library is used to handle data extraction from or insertion to the WAV and JPEG files in both client and server applications.

Figure 6:
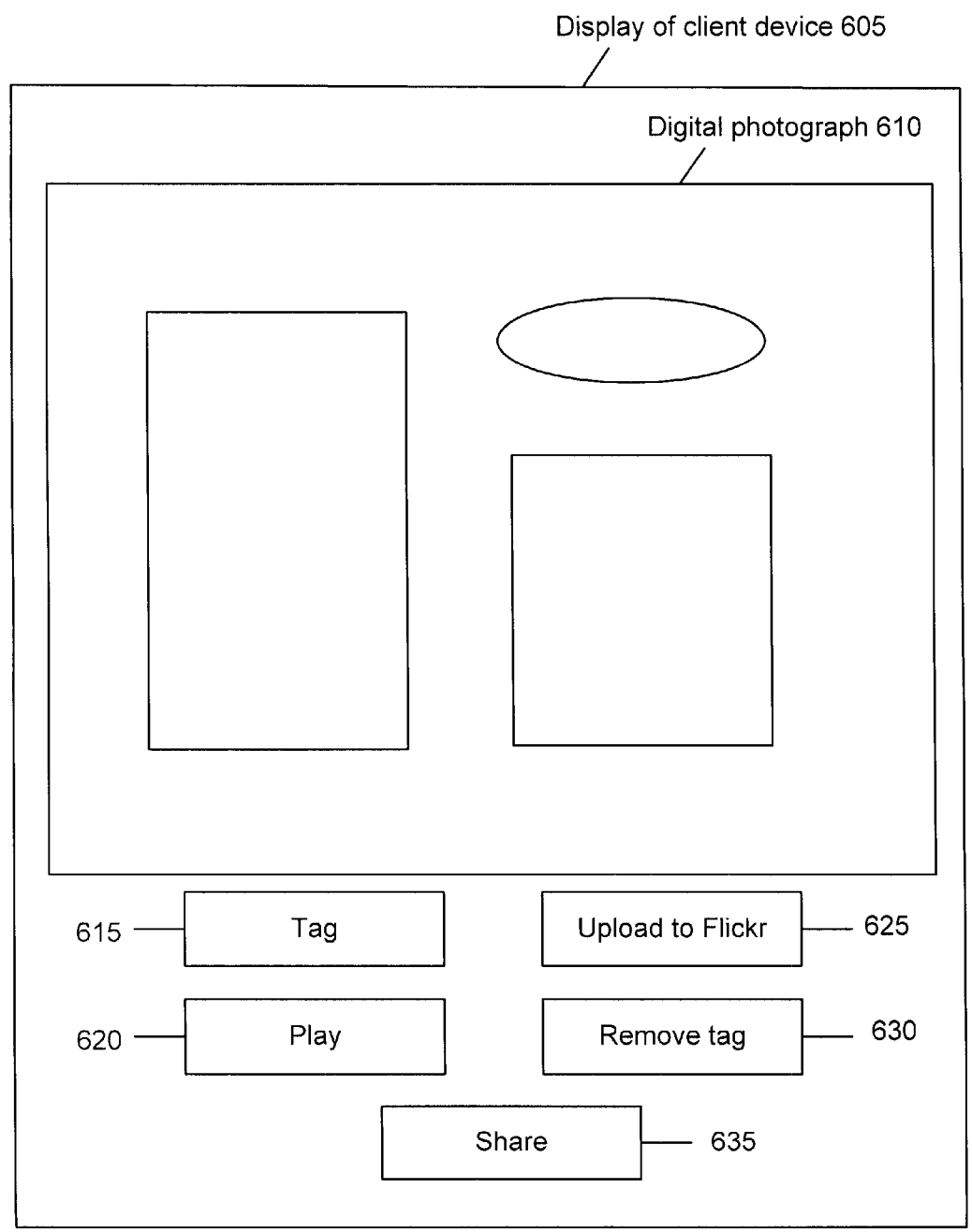
FIG. 6 is an example of a user interface of the client device after the user uses the client device to capture a digital photograph in accordance with an embodiment of the present disclosure.

FIG. 6 displays an embodiment of a user interface of the client device 105 after the user uses the client device 105 to capture a digital photograph. The client device 105 displays on its display screen 605 the digital photograph 610. In one embodiment, the client device 105 also displays (via a mobile application) icons relating to the digital photograph, such as an icon 615 to tag the digital photograph by speaking into the client device 105, an icon 620 to play an assigned tag, an icon 625 to upload the image and audio tag to Flickr® (e.g., via the photo tag server 130), and/or an icon 630 to remove a previously spoken tag.

For example, suppose that the user takes a picture with his smartphone of a sunset. The smartphone stores this digital picture as a JPEG file. The smartphone displays the sunset on its screen and the user presses the tag button 615 to tag the picture. The user says "sunset on Mar. 20, 2012". The smartphone records this audio tag as a WAV file and in one embodiment embeds the audio tag into the JPEG file. The user then presses the upload the image to Flickr® button 625. The smartphone communicates the JPEG file with the (e.g., embedded) WAV file to the photo tag server 130. The photo tag server 130 transmits this file to its tag extraction module 145. The photo tag server 130 also determines a dictionary of potential textual tags 425 for this sunset based on, for example, the user's previously used tags, popular tags, etc. An example of the dictionary of potential textual tags 425 in this example includes: sunset, night, nighttime, sun, sky, rays, evening, etc. In one embodiment, the photo tag server 130 determines this dictionary of potential textual tags 425 by analyzing the digital photograph itself, such as by determining keywords that describe objects in the photograph. The photo tag server 130 communicates this dictionary of potential textual tags 425 to the tag extraction module 145. The tag extraction module 145 converts the audio tag to a textual tag based on its analysis of the words spoken by the user as well as from the dictionary of potential textual tags 425. This analysis results in one or more textual tags. In one embodiment, the photo tag server 130 then communicates one or more of the digital photograph, audio component, and textual tag(s) 430 to Flickr® on the content server 135. The user can then use his smartphone to access the digital photograph web site 150 and, for example, organize his photographs, search his photographs via tag, etc. As described above, in one embodiment the ad sever 140 displays advertisements on the smartphone to the user based on the tags entered by the user. In one embodiment, the client device 105 also includes a Share button 635 which enables the user to share the digital photograph 610, textual tags 430, audio component, and/or dictionary of potential textual tags to others via one or more social networking sites (which may be preselected by the user or may be selected by the user after this button 635 is pressed).

Figure 7A:
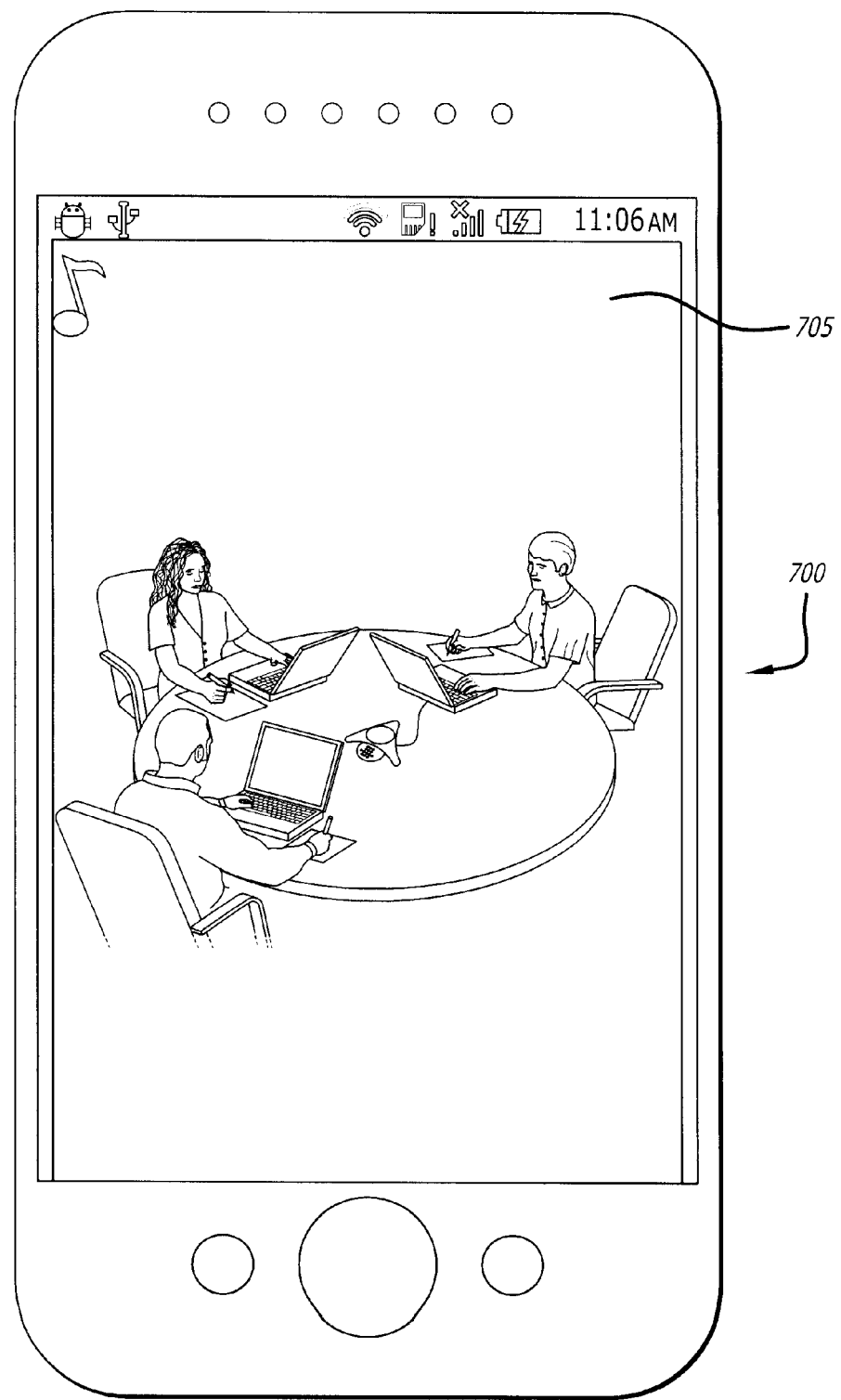
FIGS. 7A-7C are examples of a displayed user interface of a client device depicting a captured digital photograph and depicting the tags generated for this digital photograph in accordance with embodiments of the present disclosure.
Figure 7B:
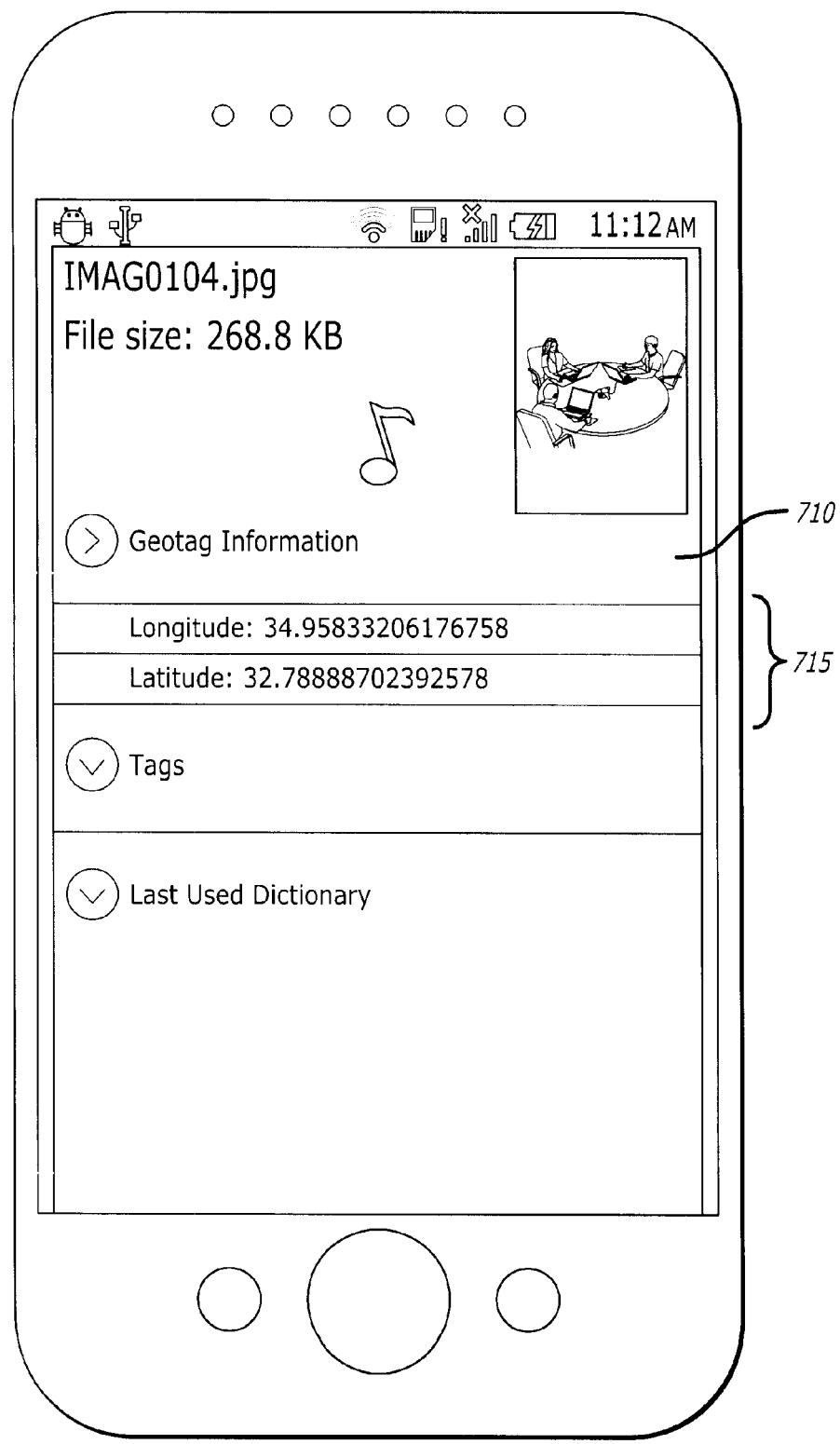
Figure 7C:
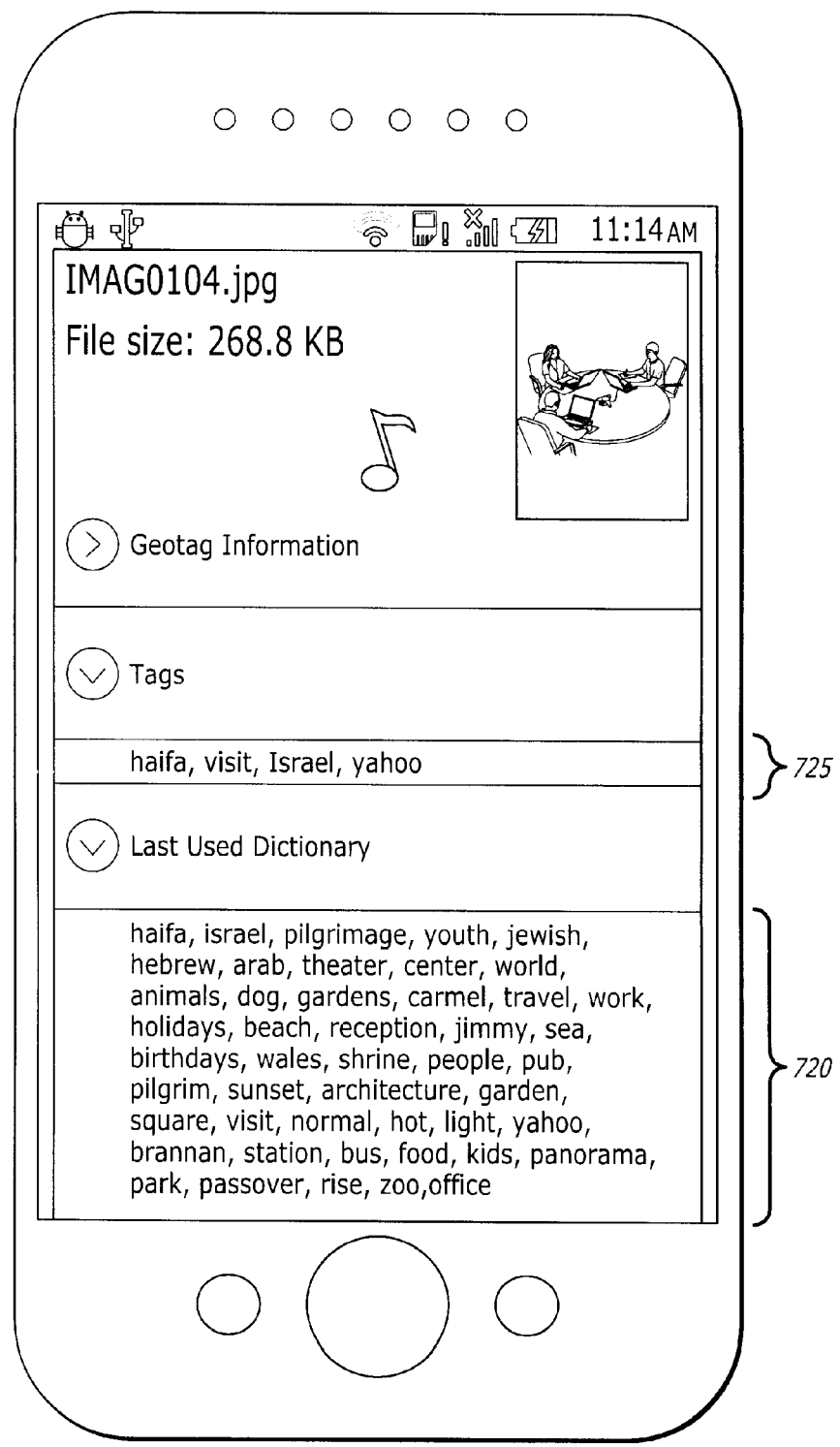

FIG. 7A is an embodiment of a photograph 700 taken by a smartphone 705. FIG. 7B is a display screen 710 of the smartphone 705 displaying geotag information 715 in longitude and latitude. As described above, this geotag information 715 is assigned to the photograph 700 as metadata. Suppose the user of the smartphone 705 says, for his tags for the photograph 700, the words "visit to Yahoo! in Haifa, Israel". FIG. 7C shows a dictionary of potential textual tags 720 that is used to determine tags 725. As described above, in one embodiment the smartphone 705 transmits the geotag information 715 to the photo tag server 130 and the tag extraction module 145 determines the dictionary of potential textual tags 720. The dictionary of potential textual tags 720 includes the tags Haifa, Israel, Yahoo, and visit. In one embodiment, the tag extraction module 145 performs speech to text conversion on the audio component to obtain words that may be tags. In one embodiment, the tag extraction module 145 then uses the dictionary of potential textual tags 720 to narrow down the extracted words into a list of tags 725. In another embodiment, the tag extraction module 145 first obtains the dictionary of potential textual tags 720 and then uses this dictionary to help with the extraction of the tags from the audio component. In one embodiment, the photo tag server 130 then transmits the dictionary of potential textual tags 720 and the selected tags 725 back to the smartphone for display.

Figure 8:
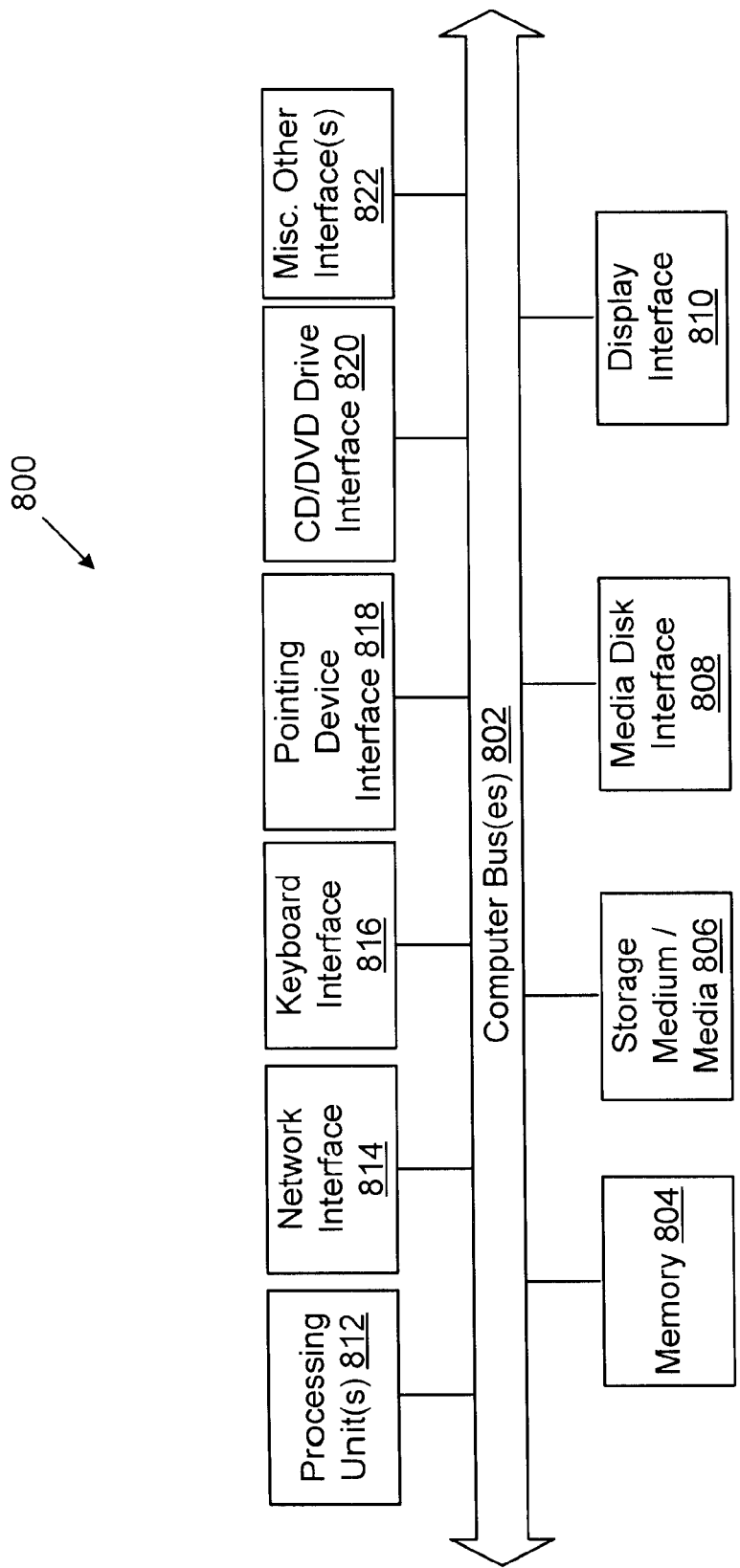
FIG. 8 is a block diagram illustrating an internal architecture of a computer in accordance with an embodiment of the present disclosure.

FIG. 8 is a block diagram illustrating an internal architecture of an example of a computer, such as server computer 130, 135, 140 and/or client device 105, in accordance with one or more embodiments of the present disclosure. A computer as referred to herein refers to any device with a processor capable of executing logic or coded instructions, and could be a server, personal computer, set top box, smart phone, pad computer or media device, to name a few such devices. As shown in the example of FIG. 8, internal architecture 800 includes one or more processing units (also referred to herein as CPUs) 812, which interface with at least one computer bus 802. Also interfacing with computer bus 802 are persistent storage medium/media 806, network interface 814, memory 804, e.g., random access memory (RAM), run-time transient memory, read only memory (ROM), etc., media disk drive interface 808 as an interface for a drive that can read and/or write to media including removable media such as floppy, CD-ROM, DVD, etc. media, display interface 810 as interface for a monitor or other display device, keyboard interface 816 as interface for a keyboard, pointing device interface 818 as an interface for a mouse or other pointing device, and miscellaneous other interfaces not shown individually, such as parallel and serial port interfaces, a universal serial bus (USB) interface, and the like.

Memory 804 interfaces with computer bus 802 so as to provide information stored in memory 804 to CPU 812 during execution of software programs such as an operating system, application programs, device drivers, and software modules that comprise program code, and/or computer-executable process steps, incorporating functionality described herein, e.g., one or more of process flows described herein. CPU 812 first loads computer-executable process steps from storage, e.g., memory 804, storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage medium/media 806 is a computer readable storage medium(s) that can be used to store software and data, e.g., an operating system and one or more application programs. Persistent storage medium/media 806 can also be used to store device drivers, such as one or more of a digital camera driver, monitor driver, printer driver, scanner driver, or other device drivers, web pages, content files, playlists and other files. Persistent storage medium/media 806 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user computing device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
receiving, by a server computer, an image file captured by a client device, the image file comprising an associated audio component, the audio component spoken by a user of the client device as a tag of the image file;
determining, by the server computer, metadata associated with the image file;
identifying, by the server computer, a dictionary of potential textual tags from the metadata;
determining, by the server computer, a textual tag from the audio component using the dictionary of potential textual tags in conjunction with speech-to-text technology; and
associating, by the server computer, the textual tag with the image file as additional metadata.

2. The method of claim 1, further comprising communicating, by the server computer to a content server, the textual tag with the image file.

3. The method of claim 1, further comprising storing, by the server computer, the image file and the textual tag.

4. The method of claim 1, further comprising enabling, by the server computer, the user to perform operations related to the image file using the textual tag.

5. The method of claim 1, further comprising communicating, by the server computer, the textual tag and the image file to the client device for display and for enabling the user to approve, reject, and edit the textual tags.

6. The method of claim 4, wherein the enabling of the user to perform operations related to the image file further comprises enabling sharing of the image file with other users.

7. The method of claim 4, wherein the enabling of the user to perform operations related to the image file further comprises
receiving, by the server computer, a search term from the client device;
searching, by the server computer, the textual tags for the search term; and
communicating, by the server computer, the image file associated with the textual tag to the client device.

8. The method of claim 1, wherein the identifying of the dictionary of potential textual tags further comprises receiving, from a content server, a plurality of previously stored tags.

9. The method of claim 8, wherein the identifying of the dictionary of potential textual tags further comprises determining the dictionary of potential textual tags from the metadata and from the plurality of previously stored tags.

10. The method of claim 1, further comprising communicating, by the server computer, an advertisement based on the textual tag.

11. The method of claim 1, further comprising enabling the audio component to be played.

12. The method of claim 1, further comprising enabling playing of the audio component at one or more of the client device and a digital photograph web site.

13. A computing device comprising:
a processor;
a storage medium for tangibly storing thereon program logic for execution by the processor, the program logic comprising:
receiving logic executed by the processor for receiving an image file captured by a client device, the image file comprising an associated audio component, the audio component spoken by a user of the client device as a tag of the image file;
metadata determining logic executed by the processor for determining metadata associated with the image file;
identifying logic executed by the processor for identifying a dictionary of potential textual tags from the metadata;
tag determining logic executed by the processor for determining a textual tag from the audio component using the dictionary of potential textual tags in conjunction with speech-to-text technology; and
associating logic executed by the processor for associating the textual tag with the image file as additional metadata.

14. The computing device of claim 13, further comprising communicating logic executed by the processor for communicating, to a content server, the textual tag with the image file.

15. The computing device of claim 13, further comprising storing logic executed by the processor for storing the image file and the textual tag.

16. The computing device of claim 13, further comprising enabling logic executed by the processor for enabling the user to perform operations related to the image file using the textual tag.

17. The computing device of claim 13, further comprising communicating logic executed by the processor for communicating the textual tag and the image file to the client device for display.

18. The computing device of claim 16, wherein the enabling logic further comprises sharing logic executed by the processor for enabling sharing of the image file with other users.

19. The computing device of claim 16, wherein the enabling logic further comprises
receiving logic executed by the processor for receiving a search term from the client device;
searching logic executed by the processor for searching the textual tags for the search term; and
communicating logic executed by the processor for communicating the image file associated with the textual tag to the client device.

20. The computing device of claim 13, wherein the identifying logic further comprises receiving logic executed by the processor for receiving, from a content server, a plurality of previously stored tags.

21. The computing device of claim 20, wherein the identifying logic further comprises determining logic executed by the processor for determining the dictionary of potential textual tags from the metadata and from the plurality of previously stored tags.

22. The computing device of claim 13, further comprising communicating, by the processor, an advertisement based on the textual tag.

23. A non-transitory computer readable storage medium tangibly storing computer program instructions capable of being executed by a computer processor, the computer program instructions defining the steps of:
receiving, by the computer processor, an image file captured by a client device, the image file comprising an associated audio component, the audio component spoken by a user of the client device as a tag of the image file;
determining, by the computer processor, metadata associated with the image file;

identifying, by the computer processor, a dictionary of potential textual tags from the metadata;
determining, by the computer processor, a textual tag from the audio component using the dictionary of potential textual tags in conjunction with speech-to-text technology; and
associating, by the computer processor, the textual tag with the image file as additional metadata.

* * * * *